US 12,487,850 B2

(12) United States Patent
Borochoff et al.

(10) Patent No.: US 12,487,850 B2
(45) Date of Patent: Dec. 2, 2025

(54) APPROACHES OF AUGMENTING AND STREAMLINING TASK EXECUTION

(71) Applicant: Palantir Technologies Inc., Denver, CO (US)

(72) Inventors: Adam Borochoff, New York, NY (US); John Mathews, New York, NY (US); Joseph Rafidi, Washington, DC (US); James Thompson, San Francisco, CA (US); Kamran Khan, New York, NY (US); Morten Telling, Copenhagen (DK); Parvathy Menon, Palo Alto, CA (US); Patrick Szmucer, London (GB); Robert Kruszewski, London (GB); Rahij Ramsharan, London (GB); Katherine Ketsdever, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 797 days.

(21) Appl. No.: 17/826,972

(22) Filed: May 27, 2022

(65) Prior Publication Data

US 2023/0333888 A1    Oct. 19, 2023

Related U.S. Application Data

(60) Provisional application No. 63/332,602, filed on Apr. 19, 2022.

(51) Int. Cl.
*G06F 9/48* (2006.01)
*G06F 11/34* (2006.01)

(52) U.S. Cl.
CPC ........ *G06F 9/4881* (2013.01); *G06F 11/3495* (2013.01)

(58) Field of Classification Search
CPC ...... G06F 1/329; G06F 9/4843; G06F 9/4881; G06F 9/4887; G06F 9/52; G06F 9/526; G06F 9/528
See application file for complete search history.

(56) References Cited

U.S. PATENT DOCUMENTS

| | | | |
|---|---|---|---|
| 10,620,854 B1* | 4/2020 | James | G06F 3/067 |
| 2021/0200745 A1* | 7/2021 | Bui | G06F 16/215 |

(Continued)

FOREIGN PATENT DOCUMENTS

EP    1659514 A1    5/2006

OTHER PUBLICATIONS

Extended European Search Report dated Aug. 23, 2023, issued in related European Patent Application No. 23167893.9 (10 pages).

(Continued)

*Primary Examiner* — Andy Ho
(74) *Attorney, Agent, or Firm* — Sheppard Mullin Richter & Hampton LLP

(57) ABSTRACT

Computing systems methods, and non-transitory storage media are provided for retrieving information regarding an operation to be performed by a platform, performing a preliminary validation of the operation, generating details regarding the preliminary validation, transmitting at least a subset of the details of the preliminary validation to the platform, and populating the generated details on an interface. If the preliminary validation fails, the platform refrains from performing the operation. Furthermore, the logic describing the operation can be executed on different platforms and is not bound or limited to one platform.

17 Claims, 13 Drawing Sheets

(56) References Cited

U.S. PATENT DOCUMENTS

| | | | | |
|---|---|---|---|---|
| 2023/0195917 A1* | 6/2023 | Bennati | ............... | G06F 16/164 |
| | | | | 726/26 |
| 2023/0224353 A1* | 7/2023 | Magana | ............... | H04L 67/01 |
| | | | | 709/203 |

OTHER PUBLICATIONS

IBM: Prepare-IBM Documentation—DB2 ver 7.1, Mar. 8, 2021, pp. 1-23; retrieved from the Internet: URL:https://www.ibm.com/docs/en/ssw_ibm_i_71/db2/rbafzpreph2.htm.

MacKay, Jory, "How to Manage Projects from Kickoff to Launch", Planio, Oct. 19, 2021, pp. 1-28; retrieved from the Internet: URL: https://plan.io/blog/how-to-manage-a-project/#step-9-check-to-see-if-you-have-adequate-resources.

\* cited by examiner

APPROACHES OF AUGMENTING AND STREAMLINING TASK EXECUTION

CROSS REFERENCE TO RELATED APPLICATIONS

This application claims the benefit under 35 U.S.C. § 119(e) of U.S. Provisional Application Ser. No. 63/332,602 filed Apr. 19, 2022, the content of which is incorporated by reference in its entirety into the present disclosure.

FIELD OF THE INVENTION

This disclosure relates to approaches of bridging a gap between creation of logic to perform computing operations and execution of the operations. These approaches perform checks or validations to ensure that the operations are feasible and compatible with the data on which the operations are to be performed, and further elucidate the operations.

BACKGROUND

Current frameworks or platforms perform computing operations using libraries of code, and executing relevant portions of the code. The libraries may be stored, acquired, and/or manually inputted. programmed using code. Skyrocketing data creation and consumption has been a catalyst that has triggered a new paradigm of computing, resulting in proliferation of distributed computing and growing complexities and expenses of operations. Annual data creation increased from 1.2 zettabytes (trillion gigabytes) to an estimated 60 zettabytes from 2010 to 2020. The sheer scope of data sizes is evidenced by a single human genome having approximately 200 gigabytes of data, the Large Hadron Collider recording over 15 petabytes (1015 bytes) of data in a single month, and the New York Stock Exchange processing four to five terabytes (1012 bytes) of data daily. One consequence of such increases in data creation and generation includes utilization of larger database sizes and more complex data transformation operations, which may be fraught with errors.

SUMMARY

Various examples of the present disclosure can include computing systems, methods, and non-transitory computer readable media configured to perform: retrieving information regarding an operation to be performed by a platform associated with the computing system; performing a preliminary validation of the operation; generating details regarding the preliminary validation; transmitting at least a subset of the details of the preliminary validation to the platform, wherein, if the preliminary validation fails, the platform refrains from performing the operation; and populating the generated details on an interface.

In some examples, the preliminary validation comprises determining a compatibility, with downstream processes, of output schemas or formats, or output data types, of resulting datasets from the operation.

In some examples, the preliminary validation comprises determining a compatibility of input datasets or datasets on which the operation is to be performed with input constraints associated with the operation.

In some examples, the preliminary validation comprises determining a compatibility between the operation and a class structure or ontology within the platform.

In some examples, the determination of the compatibility is based on an inheritance hierarchy within the platform.

In some examples, the computing systems, methods, or non-transitory computer readable media may further perform transmitting an indication to the platform of whether the preliminary validation succeeded or failed.

In some examples, the generated details comprise a potential fix, in response to a determination that the preliminary validation failed.

In some examples, the computing systems, methods, or non-transitory computer readable media may further perform selectively transmitting the potential fix to the platform based on a number of occurrences or a frequency at which the potential fix has been adopted or accepted, wherein the platform modifies or adds the potential fix to a library or repository of code.

In some examples, the computing systems, methods, or non-transitory computer readable media may further perform determining one or more changes in access control levels that would result from the operation; and transmitting the one or more changes to the platform.

In some examples, the one or more changes result from a merging or integration of two datasets revealing an association that was previously missing from each of the two datasets prior to the merging or integration.

In some examples, the computing systems, methods, or non-transitory computer readable media may further perform facilitating of additional operations. For example, the computing systems, methods, or non-transitory computer readable media may receive an indication to add an operation on top of an existing operation or modify an existing operation. The computing systems, methods, or non-transitory computer readable media may generate code or retrieve existing code corresponding to the added operation or modifications to the operation. Additionally or alternatively, the computing systems, methods, or non-transitory computer readable media may retrieve the corresponding code from the platform or transmit this indication to the platform. Furthermore, the logic describing the operation can be executed on different platforms and is not bound or limited to one platform.

Various examples of the present disclosure can include computing systems, methods, and non-transitory computer readable media configured to perform: retrieving information regarding an operation to be performed by a platform associated with the computing system; performing a preliminary validation of the operation; generating details regarding the preliminary validation; transmitting at least a subset of the details of the preliminary validation to the platform, wherein, if the preliminary validation fails, the platform refrains from performing the operation; and populating the generated details on an interface.

In some examples, the preliminary validation comprises determining a compatibility, with downstream processes, of output schemas or formats, or output data types, of resulting datasets from the operation.

In some examples, the preliminary validation comprises determining a compatibility of input datasets or datasets on which the operation is to be performed with input constraints associated with the operation.

In some examples, the preliminary validation comprises determining a compatibility between the operation and a class structure or ontology within the platform.

In some examples, the determination of the compatibility is based on an inheritance hierarchy within the platform.

In some examples, the instructions further cause the one or more processors to perform transmitting an indication to the platform of whether the preliminary validation succeeded or failed.

In some examples, the generated details comprise a potential fix, in response to a determination that the preliminary validation failed.

In some examples, the instructions further cause the one or more processors to perform selectively transmitting the potential fix to the platform based on a number of occurrences or a frequency at which the potential fix has been adopted or accepted, wherein the platform modifies or adds the potential fix to a corresponding portion of logic.

In some examples, the instructions further cause the one or more processors to perform determining one or more changes in access control levels that would result from the operation; and transmitting the one or more changes to the platform.

In some examples, the one or more changes result from a merging or integration of two datasets revealing an association that was previously missing from each of the two datasets prior to the merging or integration.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIGS. 1A-1C, 2, and 3 may also be applicable to any of FIGS. 4-9 and vice versa.

In FIG. 1A, the computing system determines compatibility of a task with a class structure, ontology, or a data structure stored in a platform, and simplifies the execution of the task by the data platform.

DETAILED DESCRIPTION

Current complexities of data operations result in bottlenecks of data processing and storage. Selectively reducing the number of data operations performed likely mitigates these existing bottlenecks. Additionally, specific details of execution relating to the data operations, such as statuses and steps, are often shrouded, and occasionally error-prone. These shortcomings are a testament that a gap exists between creation and storage of code to perform computing operations and execution of the operations.

In an effort to bridge this gap, a new approach aims to provide semantic analysis and validate a data operation before performing any execution steps. After retrieving information regarding a data operation, the validation includes a sanity check based on the constraints or requirements (hereinafter "constraints") of the data operation and contextual information of input data or data to be operated on to ensure compatibilities between the contextual information and the constraints. For example, the contextual information may include metadata, such as data types, parameters, and/or keys such as join keys, primary keys, and foreign keys. Additionally, compatibilities with any downstream operations or stages may also be verified. In such a manner, computing and storage costs resulting from attempting an infeasible operation may be mitigated or eliminated, thereby improving maintenance of a platform that executes operations.

Additionally, specific details of or regarding execution may be generated and provided. For example, these details may include specific subsets (e.g., all or a portion of) a dataset or a resource (hereinafter "resource") that are transformed, the particular transformations made, and/or the particular checks made to ensure validity of the operations. Such details may further augment and enrich the execution of operations by uncovering previously missing or hidden contextual information without providing an overwhelming amount of possibly esoteric information regarding every line of code that is executed.

Figure 1A:
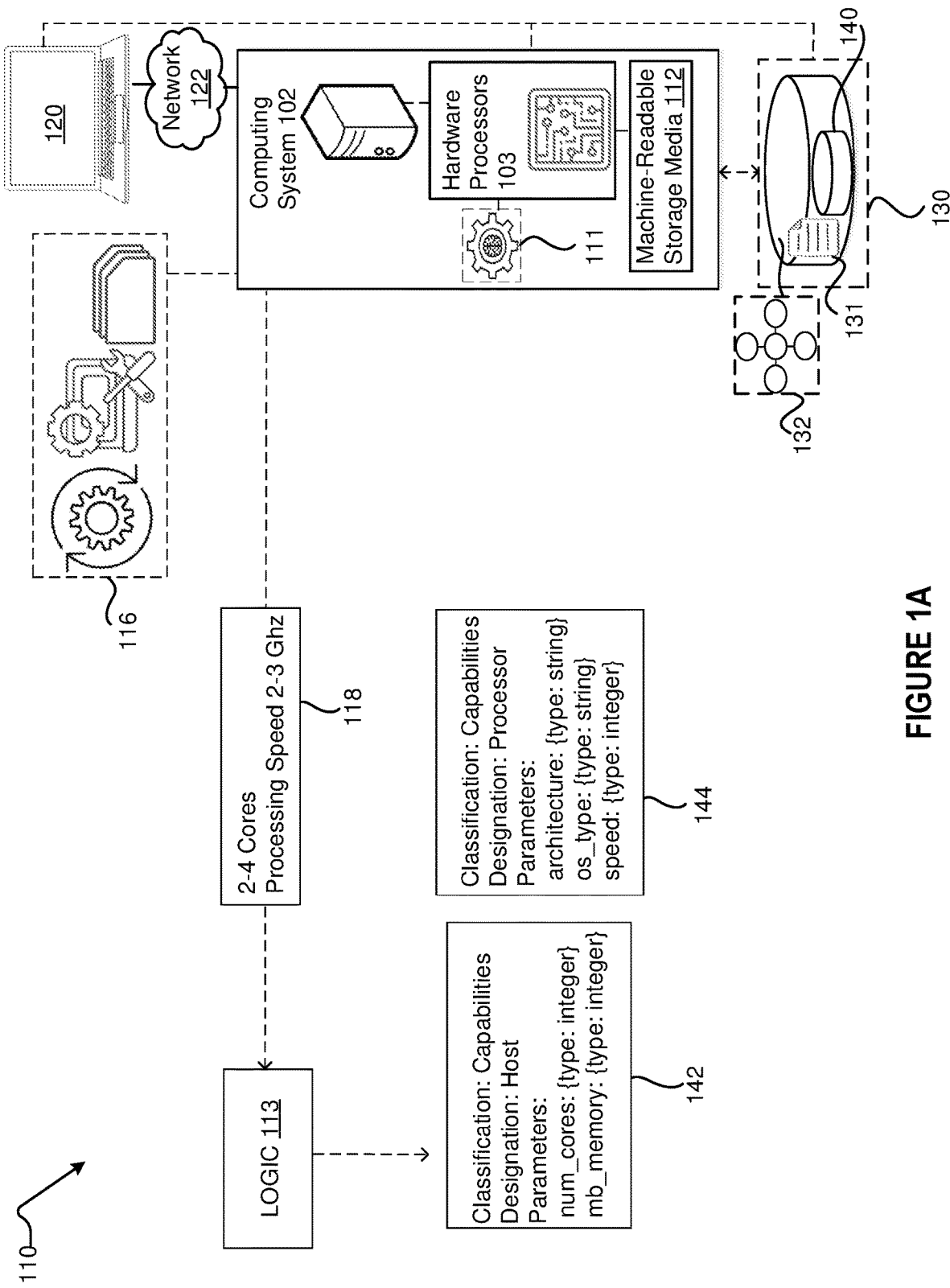
FIG. 1A illustrates an example environment or scenario (hereinafter "environment"), in accordance with various embodiments, of a computing system that streamlines and augments execution of a task or operation. The computing system may be associated with a data platform (hereinafter "platform") that separately executes a task or operation.

FIG. 1A illustrates an example environment 110, in accordance with various embodiments, of a computing system that retrieves information regarding an operation and validates the operation while generating and providing details of the operation. The operation may arise from, and/or be in response to, receiving a query or request. The computing system may perform the aforementioned steps separately from a platform 116 which includes and stores code to execute the operation, and executes the operation.

The example environment 110 can include at least a computing system 102 and at least one computing device 120. In general, the computing device 120 may be operated by an entity such as a user. The user may submit a request or query through the computing device 120. In some examples, the user may be an administrative user that provides annotations, feedback, or modifications to any of the outputs, inputs, and/or intermediate results generated from the computing system 102, and receives such outputs, inputs, and/or intermediate results. In some examples, the computing device 120 may visually render any outputs generated from the computing system 102, such as details of an operation. In general, the user can interact with the computing system 102 directly or over a network 122, for example, through one or more graphical user interfaces and/or application programming interfaces.

The computing system 102 and the computing device 120 may each include one or more processors and memory. Processors can be configured to perform various operations by interpreting machine-readable instructions, for example, from a machine-readable storage media 112. The processors can include one or more hardware processors 103 of the computing system 102. In some examples, one or more of the hardware processors 103 may be combined or integrated into a single processor, and some or all functions performed by one or more of the hardware processors 103 may not be spatially separated, but instead may be performed by a common processor.

The computing system 102 may be connected to or associated with one or more data sources or data stores (hereinafter "data sources" 130). The data sources 130 may include, or be capable of obtaining, additional information that may be specific to one or more particular operations. For example, the additional information may include contextual information, metadata, parameters, or attributes corresponding to input data or data to be operated on, intermediate results, and/or outputs generated from execution, such as data types, parameters, and/or keys such as join keys, primary keys, and foreign keys. The additional information may further include specific restraints associated with operations already executed, being executed, or that are scheduled for execution. The additional information may also encompass ontological, schema, and/or class structure information pertaining to any resources that are accessed or stored within the platform 116. The platform may utilize, without limitation, Apache Spark® or Flink®. These resources may or may not be stored, as a copy, within the data sources 130. Thus, the additional information may be used to verify compatibilities among an operation, one or more downstream operations, and the input data or data to be executed on, intermediate results, and/or outputs. By retrieving, extracting, or otherwise obtaining the additional information from the data sources 130, the computing system 102 may verify the compatibilities prior to attempting an operation, thereby saving computing and storage costs that would otherwise result from attempting an infeasible or incompatible operation. The data sources 130 may be indexed by an index 131, which may categorize the additional information based on access control levels and/or data types or representations, such as tabular data, objects, and other representations. As previously alluded to, the data sources 130 may also include one of more ontological representations 132, indicative of class information which specifies classes, attributes, and relationships among classes such as inheritance.

The data sources 130 may be divided into at least one segment 140. Although one segment 140 is shown for purposes of simplicity, the data sources 130 may be understood to include multiple segments. As an example, one segment may include, and/or store additional information related to, a specific subset of the additional information. Therefore, each segment may be particularly tailored to or restricted to storage and management of resources having a particular purpose, categorization, access control constraint, and/or of a particular subject matter. Such segregation of the additional information in different segments may be desirable in scenarios in which access to, dissemination, and/or release of the additional information from one segment is to be determined and managed separately from those resources in other segments, and only specific users may have access to one or more particular segments of resources.

Additionally or alternatively, the data sources 130 may be divided into multiple segments in order to sequester access to particular information based on access control levels or privileges of each of the segments. For example, each segment may be, or be labelled as, accessible only by persons (e.g., users operating the computing device 120) having one or more particular access control levels or privileges. The demarcation of information within the data sources 130 into segments, such as the segment 140, provides clear delineations, classification levels and/or access constraints of each of the segments. As an example, one segment may have a classification level of "confidential," while another segment may have a classification level of "top secret." A classification level of a segment may indicate or define a maximum classification level of information or resources that are permitted within the segment. In particular, if one segment has a classification level of "confidential," then information or resources classified up to and including, or, at or below a level of, "confidential" may be permitted to be ingested into the segment while information or resources classified at a level higher than "confidential" may be blocked or restricted from being ingested into the segment. In some examples, the classification levels may be inherited or transferred from already defined classification levels of the external sources. In some examples, the classification levels may be automatically or manually set.

The hardware processors 103 may further be connected to, include, or be embedded with logic 113 which, for example, may include protocol that is executed to carry out the functions of the hardware processors 103. The logic 113 may be differentiated from the code, for example, within the platform 116, that actually describes operations and/or transformations, The hardware processors 103 may also include or be associated with one or more machine learning components or models (hereinafter "machine learning components") 111. The machine learning components 111 may perform any relevant machine learning functions by generating one or more outputs indicative of results or predictions.

These machine learning functions can include, or be involved in, execution of operations. Specifically, the machine learning functions may entail possible mechanisms, such as additional operations, to resolve an incompatibility, as well as possible ways to further enhance or augment outputs. In some examples, machine learning functions of the machine learning components 111 may be embedded within or incorporated within the logic 113.

The machine learning component 111 may be trained using at least two subsets of training data sequentially. A first subset of training data may include examples regarding particular scenarios (e.g., types, classifications, categories, and/or other parameters or attributes regarding incidents) and scores corresponding to, or mapped to, the scenarios. A second subset of training data may be generated, either by the computing system 102 or a separate computing system, and include examples that the machine learning component 111 incorrectly inferred, or having threshold similarities to the examples that were incorrectly inferred by the machine learning component 111. In such a manner, the machine learning component 111 may be improved by retraining on examples in which the machine learning component 111 performed worst.

The machine learning components 111 may be improved by iterative feedback or retraining. For example, if the machine learning component 111 infers that a fix to a particular incompatibility or issue is to delete the problematic portion of data, but user feedback indicates that this fix is rarely implemented, then the machine learning component 111 may infer that a different fix should be applied, such as, retaining the data but modifying the data.

In general, the logic 113 may be implemented, in whole or in part, as software that is capable of running on one or more computing devices (e.g., the computing device 120) or systems such as the hardware processors 103, and may be read or executed from the machine-readable storage media 112. In one example, the logic 113 may be implemented as or within a software application running on one or more computing devices (e.g., user or client devices such as the computing device 120) and/or one or more servers (e.g., network servers or cloud servers). The logic 113 may, as alluded to above, perform functions of, for example, receiving an indication of an operation to be performed, receiving contextual information of input data or data on which the operation is to be performed, and determining compatibilities between the operation and the contextual information to ascertain whether the operation is feasible. As illustrated, for example, in FIGS. 1B, 5, 7, and 9, the logic 113 may further generate specific details of or regarding the operation. For example, these details may include specific subsets (e.g., all or a portion of) a resource that are transformed, the particular transformations made, and/or the particular checks made to ensure validity of the operation. As a particular example, the logic 113 may generate an indication that one or more columns have been transformed, merged, and/or deleted, one or more objects or attributes of objects have been altered, and/or an indication of causes of any incompatibilities. The logic 113 may operate separately from the platform 116, which stores the code to perform the operation and executes the operation. For example, the logic 113 may operate on a separate layer, such as an intermediate layer between the code to perform the operation and the execution of the operation. Through such separation, the logic 113 may operate platform-agnostically, while preventing further processing burdens on the platform 116.

Meanwhile, the logic 113 may determine or ensure that the data to be operated on, input data, any intermediate results, and/or outputs, conform to the access constraints and/or classification levels, for example, of a particular user. In particular, if two datasets or resources (hereinafter "resources") individually satisfy access constraints and/or classification levels, certain operations, such as those involving integrations of the two resources, may cause a result or output to have a higher classification level compared to when each of the two resources exist individually. This higher classification level may stem from an additional association being revealed or inferred as a result of the resources being integrated. For example, this additional association may be between two entities, one of which is described in a first resource and another of which is described in a second resource, when the first resource and the second resource are integrated. Additionally, when two or more resources are integrated, other constraints such as dissemination controls or release controls may be different compared to when each of the resources exist individually.

The logic 113 may ensure that a user has appropriate permissions, such as access, viewing, or editing permissions, on a resource on which an operation is to be performed, an intermediate result, and/or an output. If not, the logic 113 may redact a portion of the resources that exceed or violate the constraints and/or classification levels for the user. In another exemplary manifestation, the logic 113 may determine whether, and/or to what degree, a user requesting access to a particular resource is actually authorized to do so. For example, the logic 113 may determine that even though a user satisfies a clearance level corresponding to a classification of a particular segment, the user may not satisfy a dissemination or release control. The logic 113 may implement restrictions such as prohibiting the user from viewing or editing contents of resources, prohibiting the user from viewing an existence of resources, and/or generating tearlines to purge contents of resource portions that fail to satisfy a dissemination or release control.

As illustrated in FIG. 1A, the logic 113 may perform an exemplary operation of determining compatibilities between an operation and resources to be operated upon and/or performing other preliminary checks to determine whether an operation is feasible. For example, the compatibilities may be determined between particular requirements, criterion, or expressions within the query, and class definitions, class structures, and/or other ontological information. The class definitions, class structures, and/or other ontological information may pertain to data, entities, and/or resources within a specific database, or within the platform 116. The operation may be responsive to a query, for example, from a user or from a service such as a host. The operation itself may be performed by the platform 116, separate from the logic 113.

In some examples, a query may be directed to one or more entities, such as computing resources, that have a number or a range of computing processing units (CPUs), processing power, computing cores, processing speeds, and/or memory sizes. The query may, additionally or alternatively, specify criteria regarding particular properties of operating systems or software distributions such as operating system architectures, operating system distributions, availability status of a particular entity or portion thereof, and/or network access controls of the entities. Other queries may specify capabilities of entities based on characteristics of the service actually making the query. For example, the service may have a dynamic amount of storage capacity, and the query may seek any entity that would be able to support such an amount of storage capacity. The queries may include types indicating one or more names of classes or other descriptors to be implemented for each potential matching entity, and/or filters indicating a criterion or expression to be evaluated as either true or false for each potential matching entity.

In some examples, a query may specify a multiplicity of entities that can be combined (e.g., collaborate) to satisfy capabilities specified in the query and perform a task. The entities that collaborate may be of same types or different types. For example, entities may include routers, gateways, core-networks, and/or access-networks. In this example, one or more routers can be combined to perform a task. Alternatively, one router can be combined with a gateway to perform a task. Many variations are contemplated. In some examples, the computing component 111, and/or the platform 114, may model interactions and relationships between the entities that collaborate to determine or predict a group of entities that would collectively perform a task. For example, a gateway and a controller of the gateway may be modeled in the computing component 111 and/or the platform 114 to control flow of network data from one network to another network.

In general, entities may reside within a service topology and may be defined by parameters, numbers, names, capacities, properties, and/or indications. The capabilities or properties of the entities, or of node instances that represent the entities, may also be dynamic or static. Static properties may be fully-defined as part of a class definition, and may include, as non-limiting examples, a fixed number of memories, a fixed amount of processing power, and/or fixed sizes of memories. Meanwhile, dynamic properties may include parameters that could be variable for each node instance. One example of a dynamic property includes a current status of whether or not an entity is available to be deployed, or whether the entity is currently in use by another service.

Because the logic 113 may access or retrieve the class definitions, for example, within the ontological representations 132 in the data sources 130, the logic 113 may evaluate the query against the class definitions prior to the platform 116 actually searching for the entities. Additionally, by such evaluation, the platform 116 may eliminate searches that would fail to generate any matches. For example, if a query specifies an entity that has five computing processing units (CPUs), but a class definition requires all entities within that class to have at least ten CPUs, the logic 113 may determine that any entity within that class would fail to satisfy the query and indicate to the platform 116 to refrain from searching that class, thereby saving computing resources. Furthermore, the logic 113 may evaluate not only parent classes but also any child classes that inherit from the parent classes.

For example, a query may specify a node instance that represents an entity having a specified value or range of memory sizes such as 64 megabytes (MB). The logic 113 may search for classes associated with node instances that include, or inherit, definitions relating to the memory sizes. If a particular class associated with a node instance is a child class of a parent class that defines or specifies that instances within the parent class include computing resources of 64 MB memory, then instances within the particular class would automatically be evaluated as "true." As another example, if a particular class inherits from a parent class, or includes a definition or characteristic that instances of a parent class have between 8 and 16 MB of memory, then instances of the particular class would automatically be evaluated as "false." In both the aforementioned scenarios, because the particular class is automatically evaluated as either "true" or "false," the logic 113 would indicate to the platform 116 to avoid or refrain from searching in that particular class, thereby conserving time and computing power.

Figure 1B:
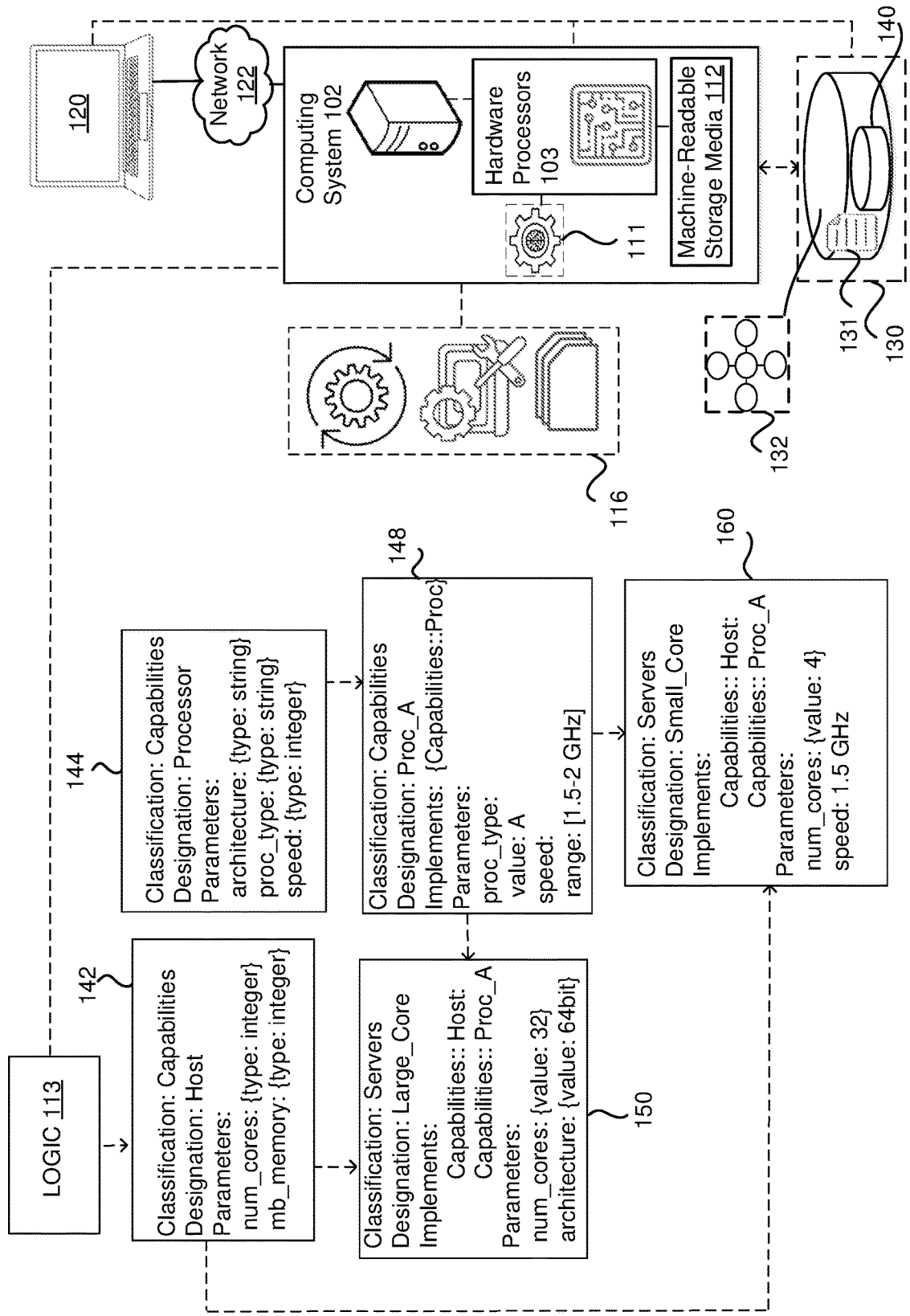
FIG. 1B illustrates an example environment, in accordance with various embodiments, of a computing system that determines compatibility of a task with a class structure, ontology, or a data structure stored in a platform, specifically, according to an inheritance hierarchy of the class structure, including multiple inheritance.
Figure 1C:
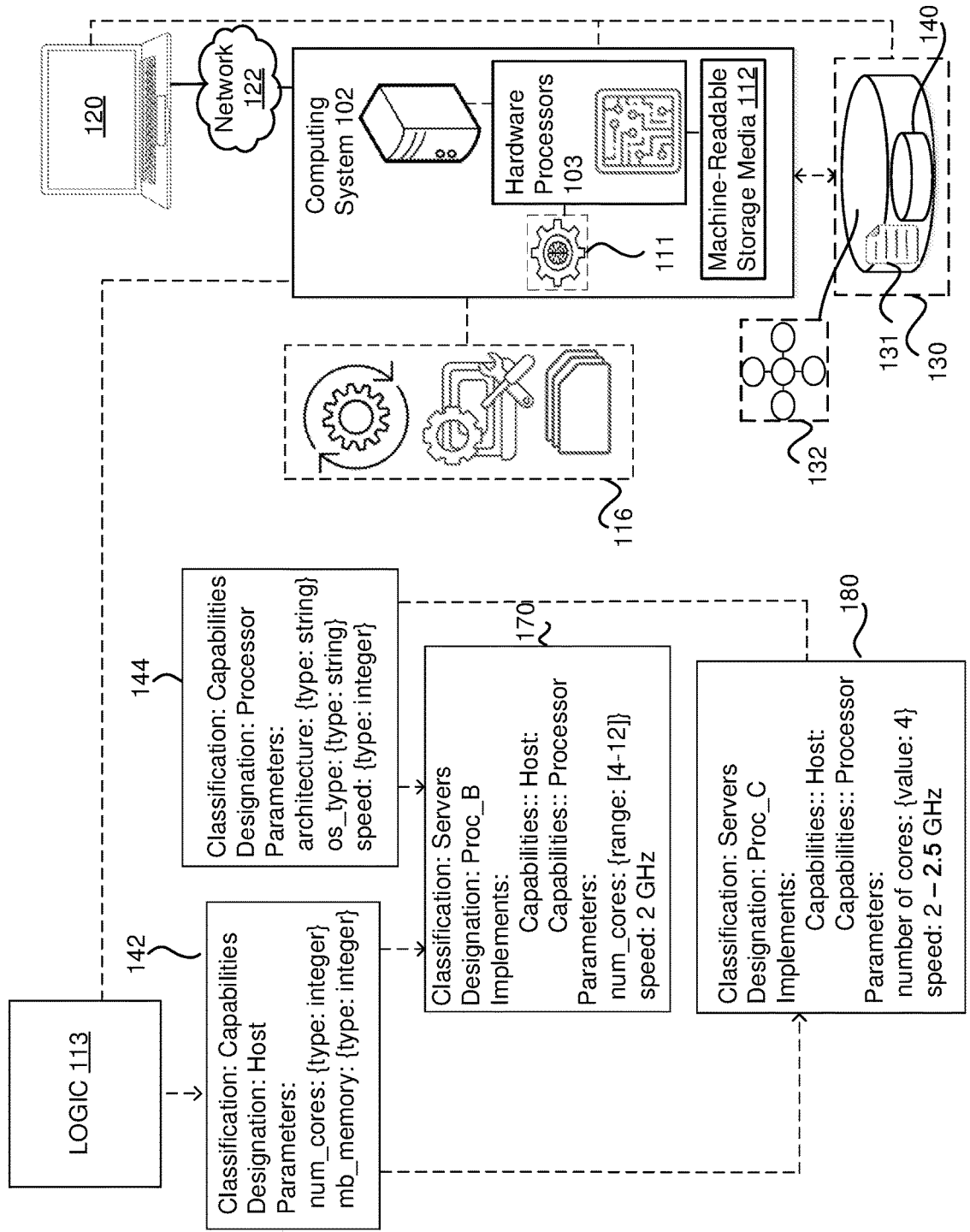
FIG. 1C illustrates an example environment, in accordance with various embodiments, of a computing system that determines compatibility of a task with a class structure, ontology, or a data structure stored in a platform, specifically, according to an inheritance hierarchy of the class structure, including multiple inheritance.

FIGS. 1A-1C illustrate particular examples in which the logic 113 evaluates a query according to inheritance among classes. In the example of FIG. 1A, the query 118 is for an entity that satisfies capabilities of a number of processing cores being between two parameters or values, in this example, 2 and 4, inclusive, and a processing speed of between 2 and 3 Gigahertz (GHz), inclusive. Although the query specifies an "and" condition in which both capabilities are to be satisfied in order for a result to be returned and the query 118 to be deemed satisfied, a query may alternately specify an "or" condition. In an "or" condition, a result in which one of multiple capabilities, which correspond to alternatives within the "or" condition, is satisfied, would still be returned and deemed to satisfy the query 118, even if other capabilities are unsatisfied. In some examples, the logic 113 may transform the criteria indicated by the query 118 into a filter expression. The filter expression may be evaluated against existing parent classes and child classes that inherit from the parent classes.

The logic 113 may initially determine any classes that include criteria of a number of cores and/or processing speeds. For example, in FIG. 1A, the logic 113 may determine that classes 142 and 144, under a classification of "capabilities" and designated as "host" and "processor," respectively, include criteria of a number of cores and a processing speed, as indicated by the "num_cores" under parameters of the class 142 and the "speed" under parameters of the class 144. Thus, the class 142, designated as "host," includes instances of entities of which a number of cores and an amount of memory are specified as capabilities. The class 144, designated as "OS," includes instances of entities of which architectures, operating system types, and processing speeds are specified as capabilities. As will be described in FIG. 1B, the logic 113 may determine further child classes or subclasses that inherit from the class 142 and/or the class 144 to determine whether or not those further classes or subclasses include additional, more specific criteria regarding the number of cores and/or the processing speeds, which would further streamline the search for entities by the platform 116.

In FIG. 1B, the logic 113 may determine that a class 148, under a classification of "capabilities" and designated as "Proc_A," inherits from the class 144, as indicated by "Implements: {Capabilities::Proc}." In other words, the class 148 includes definitions and declarations specified under the class 130. Furthermore, the class 148 may specify additional or more specific capabilities beyond those specified in the class 130. In particular, the class 148 further specifies that the processor is of a type "A" and that a range of processor speeds is between 1.5 and 2 GHz, inclusive. In other words, any node instances representing entities classified within the class 148 of "Proc_A" have a processor of a type "A" and between 1.5 and 2 GHz processing speeds. Any entity having a processor besides a type "A" processor, or any entity having a processing speed less than 1.5 GHz or greater than 2 GHZ, are not part of the class 148. When the logic 113 evaluates the query 118 against the class 148, a returned value may be neither false nor true, indicating that some node instances within the class 148 may satisfy the query 118. The logic 113 may then evaluate other child classes of the class 148, such as a class 160, and/or determine that further searching of the individual node instances of the class 148 is to be done by the platform 116.

Next, the logic 113 may determine that a class 150, designated as "Proc_A" under a classification of "servers," inherits from both the class 148 and the class 142, as indicated by "Implements: Capabilities::Host:" and "Capabilities::Proc_A." Thus, the class 150 includes definitions and declarations specified under the classes 148 and 142, thereby indicating multiple inheritance. The class 150 further specifies that the number of cores is 32, and the architecture is of a 64-bit type. In other words, instances within the class 150 have 32 cores and a 64-bit CPU architecture. An instance that fails to satisfy any of the aforementioned specified parameters would not belong in the class 150. Thus, the logic 113 would determine that because the class 150 specifies 32 cores as a parameter, then no instances within the class 150 could have between 2 and 4 CPUs, as specified by the query 118. The logic 113 would then determine that any search within the class 150 would fail to return any results that satisfy the query 118. In some implementations, the logic 113 may or may not make such determination to skip or refrain from searching additional classes that inherit from the class 150, depending on whether the additional classes are permitted to change parameters or values inherited from the class 150. However, in some implementations, if the additional classes are restricted from changing parameters or values inherited from the class 150, then the logic 113 may make such determination to skip or refrain from searching the additional classes as well. The logic 113 may transmit such determination to the platform 116. As a result of skipping or refraining from searching within the class 150, time and resources of the platform 116 are conserved because the computing component 111 would otherwise have searched within the class 150. The logic 113 would evaluate the query 118 against the class 150 to be "false," indicating that no matches exist within the class 150.

Next, the logic 113 may determine that the class 160, designated as "Small_Core" under a classification of "servers," inherits from both the class 142 and the class 148, as indicated by "Implements: Capabilities::Host:" and "Capabilities::Proc_A." Thus, the class 160 includes the definitions and declarations specified under the classes 142 and 148, thereby indicating multiple inheritance. The class 160 further specifies that the number of cores is 4, and that the processing speed is 15 GHz. In other words, node instances that represent entities within the class 160 have four cores and a processing speed of 1.5 GHz. Thus, the logic 113 would determine that because the class 160 specifies an processing speed of 1.5 GHZ, then no node instances within the class 160 could have a processing speed of between 2 and 3 GHZ, as specified by the query 118. The logic 113 would then skip or refrain from searching within the class 160, along with classes that inherit from the class 160, thereby conserving time and resources of the platform 116, that would otherwise have searched within the class 160 and/or child classes of the class 160. The logic 113 would evaluate the query 118 against the class 160 to be "false," indicating that no matches exist within the class 160.

In addition, because the classes 150 and 160 both inherit from multiple parent classes, 142 and 148, the classes 150 and 160 may be prohibited from overriding any definitions and declarations inherited from the parent classes. However, if, somehow, a definition or declaration were overridden, resulting in multiple inheritance from two conflicting definitions or declarations in two different classes, a criteria may be established to determine which class to inherit from. For example, the criteria may include selecting a class having more specific parameters or criteria, or alternatively, less specific parameters or criteria. Parameters indicating a particular value or ranges may be considered to be more specific compared to parameters devoid of a particular value or ranges, while parameters indicating a particular value (e.g., 4 cores) may be considered to be more specific compared to parameters that specify a particular range (e.g., 4-32 cores) without specifying a particular value.

FIG. 1C illustrates an implementation in which the logic 113 evaluates the query 118 against classes to be "true" or at least partially "true." In FIG. 1C, classes 170 and 180, designated as "Proc_B" and "Proc_C," respectively, under a classification of "servers," both inherit from the classes 142 and 144, as indicated by "Implements: Capabilities::Host:" and "Capabilities::Processor." Thus, the classes 170 and 180 include definitions and declarations specified under the classes 142 and 144. The class 170 further specifies that the number of cores is in a range between 4 and 12, and that the processing speed is 2 GHz. Therefore, the logic 113 evaluates the query 118 against the class 170 to be partially true because the criteria of the processing speed is satisfied while the number of cores being in a range between 4 and 12, inclusive, may be satisfied for at least some node instances within the class 170. The logic 113 may then indicate to the platform that the only criteria to be evaluated by the platform within the class 170 pertains to the number of cores, because the criteria of the processing speed is already satisfied by all node instances within the class 170, thereby simplifying the search by the platform 116.

Meanwhile, the class 180 further specifies that the number of cores is 4, and that the processing speed is between 2 and 2.5 GHZ. Therefore, the logic 113 evaluates the query 118 against the class 180 to be true because the criteria of the number of cores and of the processing speed specified by the query 118 are satisfied. Every instance within the class 180 would satisfy the query 118, so the logic 113 may indicate to the platform 116 that searching within the class 180 may be skipped.

Figure 2:
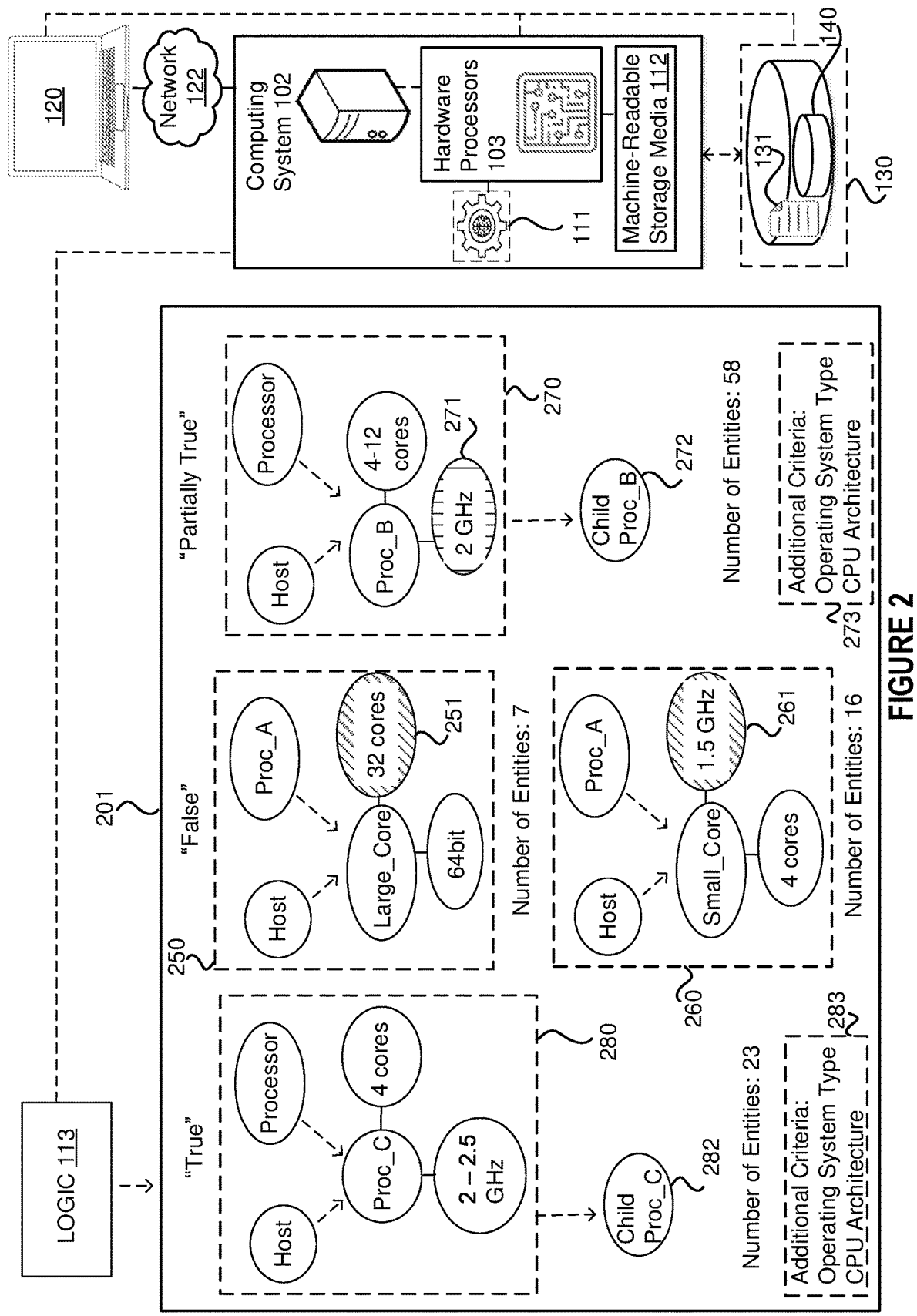
FIG. 2 illustrates a computing system generating and populating details regarding the task or operation, before execution of the task or operation.

FIG. 2 illustrates an interface 201 which is populated, by the logic 113 with results regarding the evaluation conducted, for example, in previous FIGS. 1A-1C. Such an interface 201 may enrich the results generated by the logic 113 by elucidating relevant details including contextual information regarding node instances that satisfy, or fail to satisfy, the query 118. The details may lead to further refinement of the query 118. In FIG. 2, the logic 113 may generate results of classes that evaluated to "true," including the class 180, classes that evaluated to "false," including the classes 150 and 160, and classes that evaluated to "partially true," including the class 170. In particular, the logic 113 may generate and populate a representation 280 of the class 180, which evaluated to "true," meaning that all node instances within the class 180 satisfy the query 118. The representation 280 may include a designation or name, "Proc_C," particular attributes of the class 180 including a number of cores being 4 and a processing speed being between 2 and 2.5 GHZ, and parent classes from which the class 180 inherits from. Here, the parent classes include the classes 142 and 144, designated as "Host" and "Processor," respectively. The logic 113 may further output a number of node instances or entities, for example, 23, within the class 180. Additionally, the logic 113 may generate and output representations 282 of any child classes, including attributes thereof, of the parent class 180. The child classes, and the attributes thereof, may elucidate how the results may be further narrowed down. The logic 113 may further generate suggestions of additional criteria 283 to further refine the query 118. These suggestions may include criteria that are among the most differentiating to further narrow down the results within the class 180. The logic 113 may determine which criteria are among the most differentiating based on attributes of child classes of the parent class 180. For example, the additional criteria 283 may include operating system types and/or CPU architectures. As one example, if, among the 23 entities within the class 180, 11 entities have type "A" operating systems and 12 entities have type "B" operating systems, then specifying the operating system as part of a criteria in the query 118 may narrow down the results by approximately one-half.

Next, the logic 113 may generate and populate a representation 250 of the class 150, which evaluated to "false," meaning that all node instances within the class 150 fail to satisfy the query 118. The representation 250 may include a designation or name, "Large_Core," particular attributes of the class 150 including a number of cores being 32 and a 64-bit architecture, and parent classes from which the class 150 inherits from. Additionally, the logic 113 may output, or indicate, a condition 251 that was violated, causing the "false" evaluation. Here, the condition 251 that was violated is the number of cores being 32, which contradicts the criteria of two to four cores indicated by the query 118. The parent classes include the classes 142 and 148, designated "Host" and "Proc_A," respectively. The logic 113 may further output a number of node instances, for example, 7, within the class 150.

Next, the logic 113 may generate and populate a representation 260 of the class 160, which evaluated to "false," meaning that all node instances within the class 160 fail to satisfy the query 118. The representation 260 may include a designation or name, "Small_Core," particular attributes of the class 150 including a number of cores being 4 and a processing speed of 1.5 GHz, and parent classes from which the class 150 inherits from. Additionally, the logic 113 may output, or indicate, a condition 261 that was violated, causing the "false" evaluation. Here, the condition 261 that was violated is the processing speed being 1.5 GHZ, which contradicts the criteria of 2 to 3 GHz processing speed indicated by the query 118. The parent classes include the classes 142 and 148, designated "Host" and "Proc_A," respectively. The logic 113 may further output a number of node instances, for example, 16, within the class 150.

Next, the logic 113 may generate and populate a representation 270 of the class 170, which evaluated to "partially true," meaning that a search criteria used by the platform 116 may be simplified, because all node instances within the class 170 have been determined to satisfy the processing speed aspect of the query 118. Thus, the only criteria against which the platform 116 searches for potentially matching node entities is the number of cores. The representation 270 may include a designation or name, "Proc_B," particular attributes of the class 170 including a number of cores being between 4 and 12 and a processing speed of 2 GHZ, and parent classes from which the class 170 inherits from. Additionally, the logic 113 may output, or indicate, a condition 271 that was fulfilled, causing the "partially true" evaluation. Here, the condition 271 that was fulfilled is the processing speed being 2 GHZ, which satisfies the criteria of 2 to 3 GHz processing speed indicated by the query 118. The parent classes include the classes 142 and 144, designated "Host" and "Processor," respectively. The logic 113 may further output a number of node instances, for example, 58, within the class 150. Additionally, the logic 113 may generate and output representations 272 of any child classes of the parent class 170. The child classes, and the attributes thereof, may elucidate how the results may be further narrowed down. The logic 113 may further generate suggestions of additional criteria 273 to further refine the query 118. These suggestions may include criteria that are among the most differentiating to further narrow down the results within the class 170. For example, the additional criteria 273 may include operating system types and/or CPU architectures. As one example, if, among the 58 entities within the class 170, 29 entities have 64 bit operating systems and 29 entities have 32 bit operating systems, then specifying the architecture of the operating system as part of a criteria in the query 118 may narrow down the results by one-half.

Figure 3:
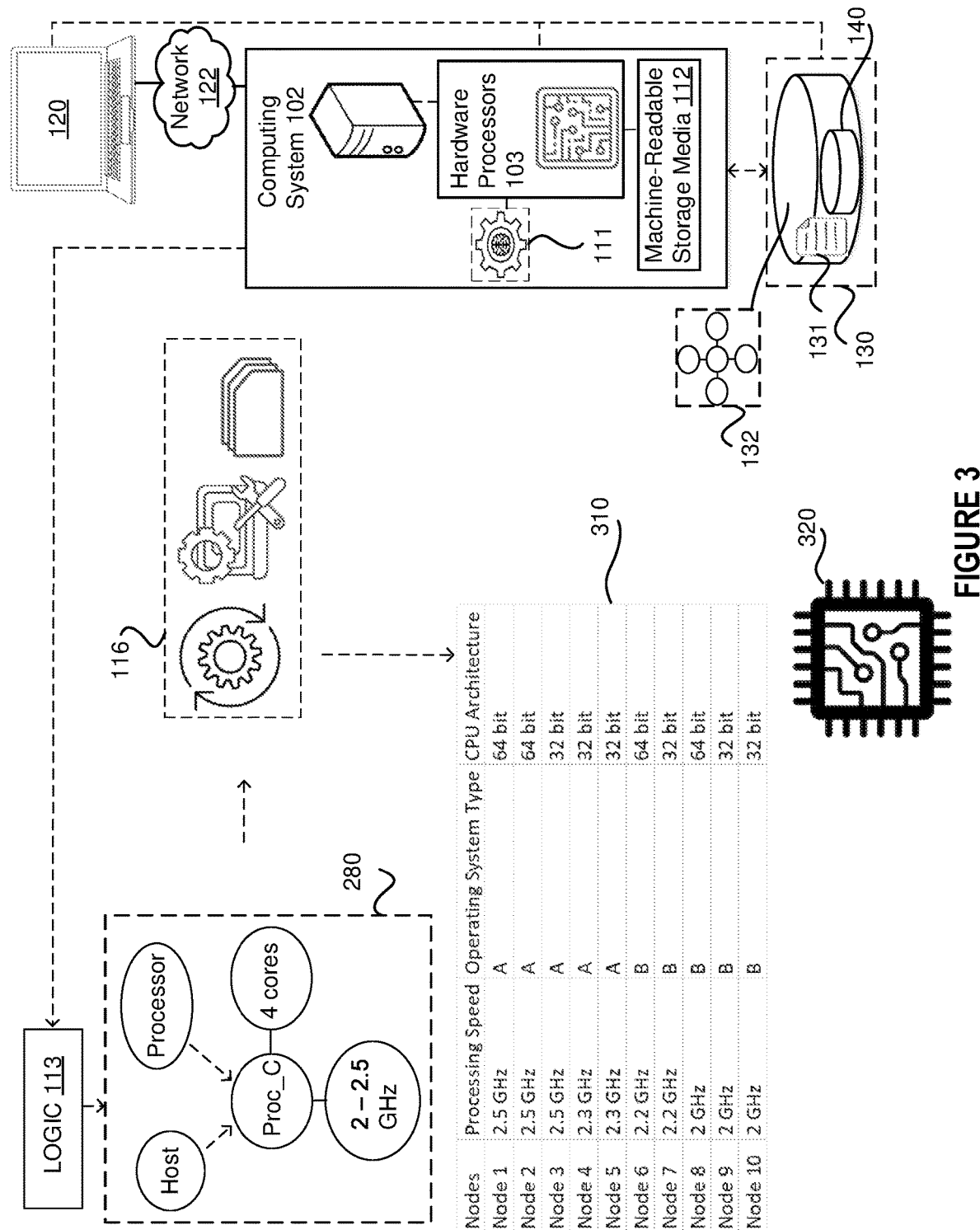
FIG. 3 illustrates an output resulting from execution of the task or operation by the platform, in conjunction with the computing system.

FIG. 3 illustrates an example of provisioning of results of the query 118. In FIG. 3, the logic 113 may transmit, to the platform 116, the representation 280 indicating that the class 180 evaluated to "true." Although not illustrated in FIG. 3 for simplicity, the logic 113 may also transmit the representations 250, 260, and 270, to the platform 116. The platform 116 may generate and return a subset (e.g., a portion or all of) the 23 results 310 from the class 180, along with further details regarding the results 310. In some examples, the results 310 may be limited to node instances representing currently available entities that are not otherwise in use or reserved. Alternatively, the results 310 may include node instances representing both available and unavailable entities, unless an availability of an entity is specified as a criteria.

In FIG. 3, an entity 320 represented by one of the node instances within the results 310 may be selected, configured, and/or provisioned by the logic 113. The selection of one or more entities 320 may include 4 CPUs as illustrated in FIG. 3. The selected entity 320 may be reserved by or delegated or allocated to the service, such as the database host, for which the query 118 was evaluated. In particular, the service, such as the database host, may transmit data packets to the entity 320 to authenticate the service. Once authenticated, the service may receive data packets from the entity 320.

The subsequent FIGS. 4-9 illustrate data operations such as joining, merging, and/or transforming one or more datasets or resources. Although FIGS. 4-9 pertain to tabular data, the principles may apply to any type, representation, or format of data to be operated on. The code to perform such operations may be stored and executed within the platform 116. Meanwhile, the logic 113 may perform semantic analysis on data to be operated on or input data, as well as intermediate results and other outputs. The logic 113 may determine any potential or actual errors that could occur during execution, for example, during a preliminary sanity check. For example, the logic 113 may determine compatibility of output schemas or formats with downstream processes, input constraints, and provenance or lineage of entries such as rows or columns prior to the platform 116 actually executing any operations. Although FIGS. 4-9 illustrate individual transformations, any or all of these transformations may be grouped together into a single integrated operation.

Figure 4:
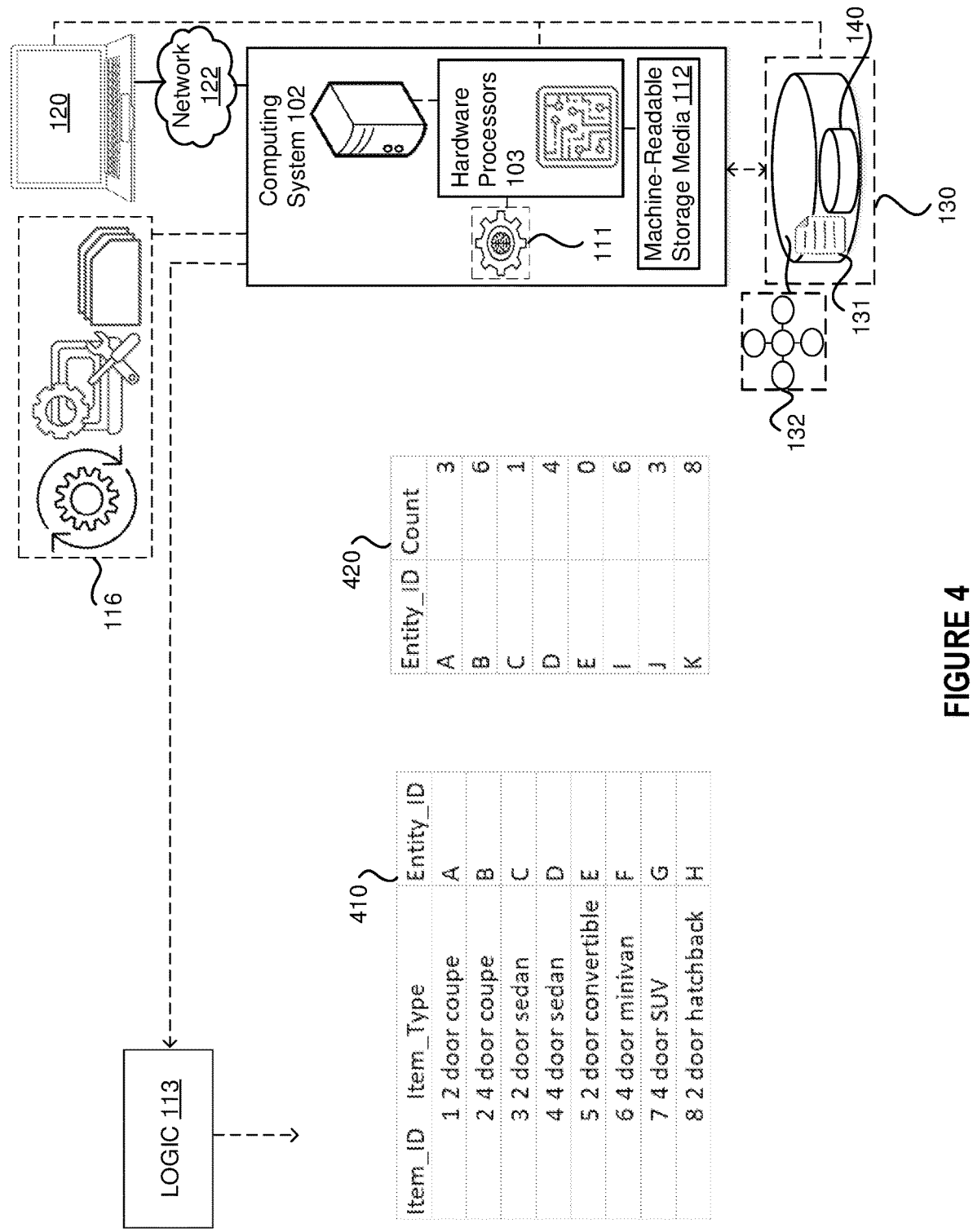
FIG. 4 illustrates a computing system performing a preliminary check or verification prior to an operation, specifically, a join or merge operation.

FIG. 4 illustrates the logic 113 performing a sanity check or compatibility determination during a join or merge operation. Further details of join operations are provided in U.S. patent application Ser. No. 15/900,289, filed Feb. 20, 2018, hereby incorporated by reference in its entirety. Further details of verifying compatibilities and detecting violations, generally, and not merely specific to a join operation, is provided in U.S. patent application Ser. No. 16/250,810, filed Jan. 17, 2019, hereby incorporated by reference in its entirety.

FIG. 4 pertains to a left join operation between datasets 410 and 420, but any join or merge operation may be contemplated. For example, other join operations may include, without limitation, a cross join, an inner join, an equi-join, a natural join, a right join, a combination of a left and right join, or a self-join. The logic 113 may identify a primary key and a foreign key. Here, the primary key is "Item_ID," of the dataset 410 and the foreign key is "Entity_ID" of the dataset 420. The logic 113 may determine any potential or actual errors or discrepancies associated with the primary key and the foreign key. For example, one determination may be whether the foreign key of the dataset 420 fails to match or correlate with a column in the dataset 410. Additionally, the logic may identify whether the primary key and the foreign key fail to uniquely identify each entry. In such scenarios, the logic 113 may indicate such failures to prevent the platform 116 from even attempting a join.

Figure 5:
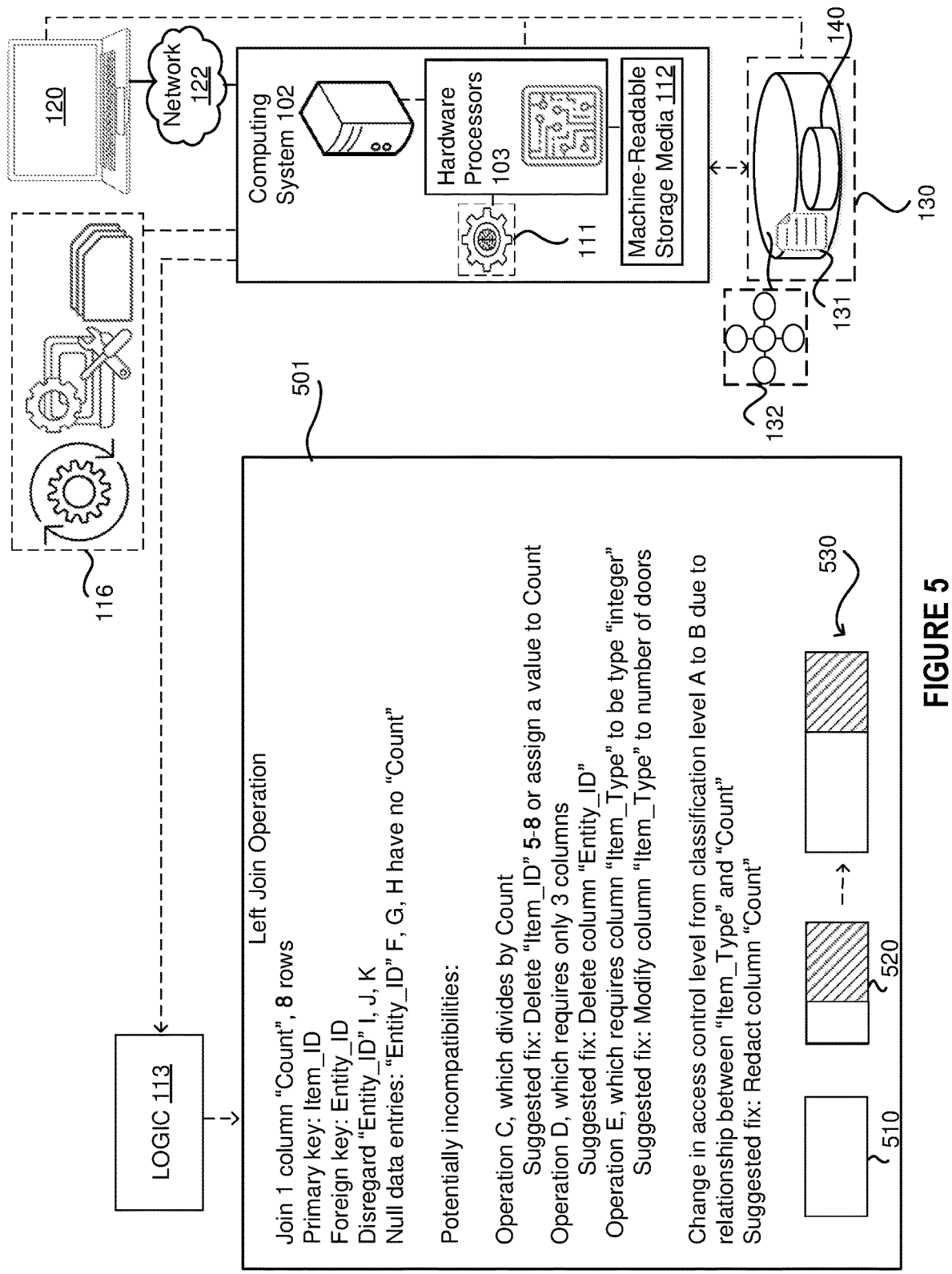
FIG. 5 illustrates a computing system generating and populating results of the preliminary check or verification of FIG. 4.

FIG. 5 illustrates the logic 113 generating and populating results of the sanity check or compatibility determination on an interface 501. The logic 113 may indicate specific details regarding the left join operation, such as, that the left join operation entails joining one column denoted as "Count," which includes 8 rows. The logic 113 may identify a primary key, "Item_ID," and a foreign key, "Entity_ID." Because the operation is a left join, the logic 113 may determine that "Entity_ID" corresponding to I, J, and K are not joined and disregarded, due to the dataset 410 having no entries corresponding to "Entity_ID" I, J, and K. Additionally, the logic 113 may identify that upon joining, "Entity_ID" corresponding to F, G, and H have no information in the "Count" column, which would constitute null data entries.

The logic 113 further determines any potential incompatibilities or conflicts (hereinafter "incompatibilities") regarding the left join operation, as well as regarding potential or actual downstream operations. For example, these incompatibilities may stem from incompatibilities in resulting data types, schemas, or markers. The logic 113 may further determine and output potential or suggested fixes to these potential incompatibilities, on the interface 501 and/or transmit these potential or suggested fixes to the platform 116. In some examples, the logic 113 may output suggested fixes and/or transmit these suggested fixes to the platform 116 if those fixes have been suggested or accepted at least a threshold number of times, and/or potential incompatibilities related to those fixes have occurred at least a certain number of times or at a certain frequency. In such a manner, the logic 113 may transmit, back to the platform which contains code to execute operations, either modifications to the code or additional code for alternatives to existing operations to be added in a library. The platform 116 may generate the modifications or additional code either automatically, or may prompt manual modification or addition of code.

In some examples, the logic 113 may receive an indication of an additional operation to be performed. The logic 113 and/or the platform 116 may generate code that performs such an additional operation, and/or retrieve or modify existing code to perform this additional operation. In such a manner, a user may prompt or specify modifications or additional operations without actually coding.

Here, the logic 113 may determine that an output from the left join operation may be incompatible with potential or actual downstream operations including Operation C, which divides by entries in the "Count" column. Because "Count" has a zero value corresponding to "Item_ID" 5 and null data entries corresponding to "Item_ID" 6 through 8, division by these entries may be undefined or nonsensical. The logic 113 may then suggest a fix to delete the data entries corresponding to the "Item_ID" 5 through 8, or alternatively, assign some value to "Count" for the "Item_ID" 5 through 8. If either suggestion is accepted, the logic 113 may transmit such an indication back to the platform 116 so that the platform 116 may automatically generate an addition or a modification to existing logic such as the logic 113 or portions thereof. The logic may encompass, as nonlimiting examples, parameters, expressions, functions, arguments, evaluations, conditions, and/or code. Additionally or alternatively, the logic 113 may receive such an addition or modification manually from a user. Yet another operation that may be incompatible is Operation D, which may only work on a maximum size of three columns. Here, after the left join operation, the resulting dataset has four columns. Thus, the logic 113 may suggest a fix to delete one of the columns, which may be redundant, "Entity_ID," as "Item_ID" already uniquely identifies each data entry. Moreover, the logic 113 may determine that Operation E could also be incompatible with the resulting dataset because Operation E only accepts type "integer" in the column corresponding to "Item_Type." Thus, the logic 113 may determine a suggested fix to convert that column to integer value, by extracting the integer from strings in the "Item_Type" column while discarding the remainders of the strings.

The logic 113 may further determine potential and/or actual changes in access control constraints or levels resulting from the left join operation. For example, each of the datasets 410 and 420 may individually have a classification level A. However, upon joining or merging of the datasets 410 and 420, a resulting dataset may have a higher classification level B. This higher classification level may stem from an additional association being revealed or inferred, which was previously missing, as a result of the datasets 410 and 420 being joined. Here, this additional association is between the "Item_Type" and "Count." Thus, upon identification of this change in access control level, the logic 113 may determine whether or not the user (e.g., from the computing device 102) still satisfies this new access control level, and if not, may transmit the indication to the platform 116 and a suggestion, which may include redacting entries that fail to conform with a user's privileges or access control levels. In such a manner, the logic 113 may determine a more granular or specific policies for access control. Instead of redacting entire columns or portions of datasets according to an access control level, the logic 113 may redact only selected entries so that access is not overly limited. Because the logic 113 may refrain from actually outputting the resulting dataset, the logic 113 may not actually enforce this new access control level. The logic 113 may further generate a representation of the left join operation, by outputting a representation 510 corresponding to the dataset 410, a representation 520 corresponding to the dataset 420, and a representation 530 corresponding to a resulting dataset from the left join operation.

Figure 6:
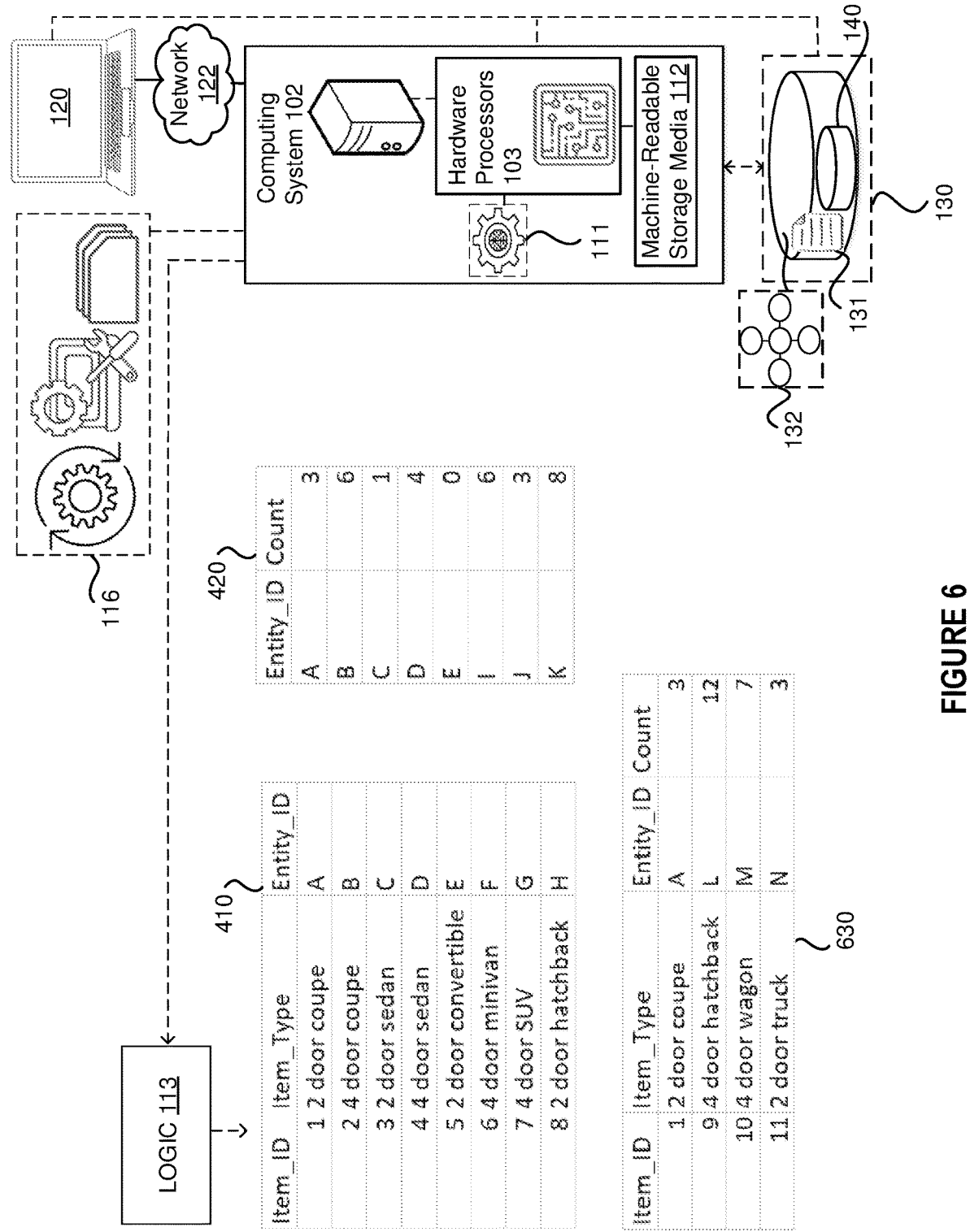
FIG. 6 illustrates a computing system performing a preliminary check or verification prior to an operation, specifically, a union operation.

FIG. 6 illustrates the logic 113 performing a sanity check or compatibility determination during a union operation on the datasets 410, 420, and a dataset 630. The logic 113 may identify common rows or columns from the datasets 410, 420, and 630 to perform the union operation. In particular, the logic 113 may identify "Entity_ID," and "Count" as being common columns among each of the three datasets 410, 420, and 630. Although the logic 113 may determine that the dataset 420 fails to include "Item_ID" and "Item_Type" columns, the logic 113 may nonetheless determine that a union operation is still feasible due to at least one column being in common among all datasets. However, if the logic 113 were to determine that no column is common among all datasets, the logic 113 may then output such determination to the platform 116 so that the platform 116 refrains from attempting such a union operation.

Figure 7:
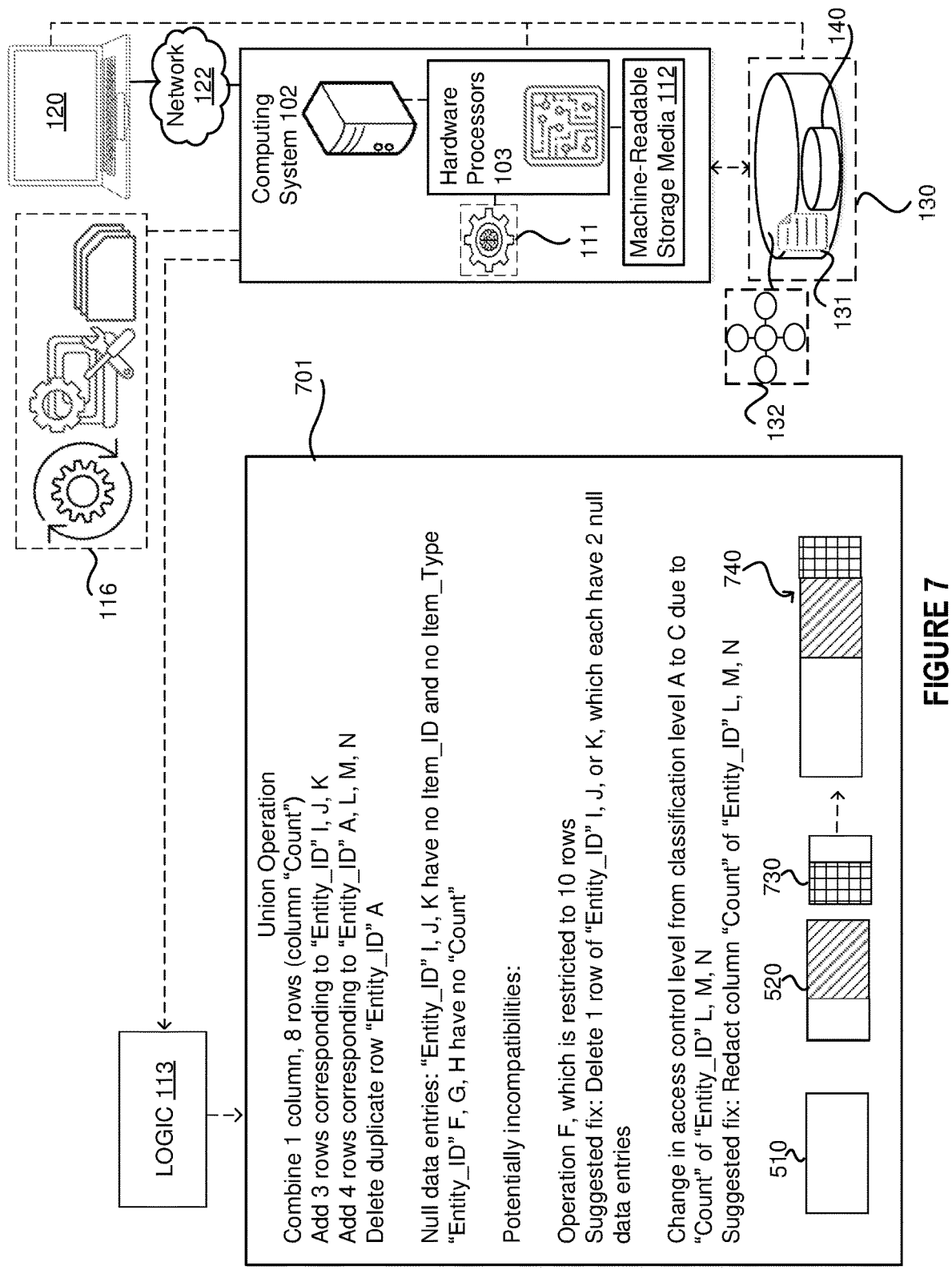
FIG. 7 illustrates a computing system generating and populating results of the preliminary check or verification of FIG. 6.

FIG. 7 illustrates the logic 113 generating and populating results of the sanity check or compatibility determination on an interface 701. The logic 113 may indicate specific details regarding the union operation, such as, that the union operation entails joining one column denoted as "Count," which includes 8 rows. Upon determining the two common columns, the logic 113 may determine to add three rows corresponding to "Entity_ID" of I, J, and K in the dataset 420, and four rows corresponding to "Entity_ID" of A, L, M, and N in the dataset 630, while deleting a duplicate row corresponding to the "Entity_ID" of A. The logic 113 may determine null data entries corresponding to "Entity_ID" of I, J, and K, which have no "Item_ID," and no "Item_Type" information, and corresponding to "Entity_ID" of F, G, and H, which have no "Count" information.

The logic 113 further determines any potential incompatibilities or conflicts (hereinafter "incompatibilities") regarding the union operation, as well as regarding potential or actual downstream operations. Here, the logic 113 may determine that an output from the union operation may be incompatible with potential or actual downstream operations including Operation F, which only operates on data of a maximum of ten rows. Here, a result from the union operation may have 11 rows. Thus, the logic 113 may suggest a fix to delete one row based on number of null data entries. For example, the logic 113 may suggest deleting one row having a highest number of, or among highest number of, null data entries, which include any rows corresponding to "Entity_ID" I, J, or K. The logic 113 may selectively transmit this fix to the platform 116, similar to the principle described in FIG. 5.

The logic 113 may further determine and/or suggest resolutions to any changes in access control levels. For example, the logic 113 may determine that a portion of the dataset 630 has a higher access control level, C, compared to the access control level A of the datasets 410 and 420, and compared to the resulting access control level B of a merged dataset including the datasets 410 and 420. The logic 113 may determine whether a user still satisfies this higher access control level C. If not, the logic may transmit this indication to the platform 116 and a suggestion, which may include redacting specific columns of entries that fail to conform with a user's privileges or access control levels. Because the logic 113 may refrain from actually outputting the resulting dataset, the logic 113 may not actually enforce this new access control level. The logic 113 may further generate a representation of the union operation, by outputting the representation 510 corresponding to the dataset 410, the representation 520 corresponding to the dataset 420, a representation 730 corresponding to the dataset 630, and a representation 740 corresponding to a resulting dataset from the union operation.

Figure 8:
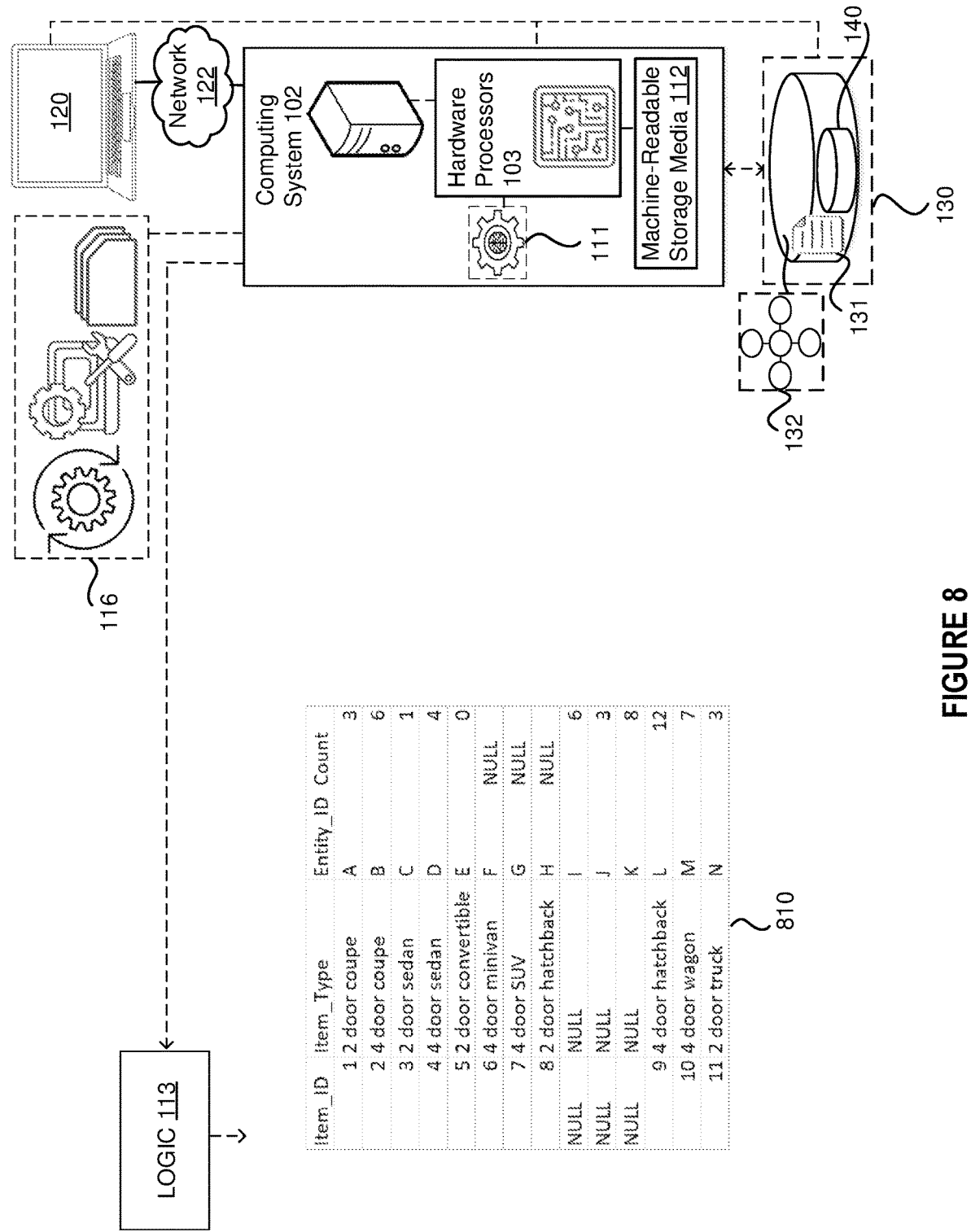
FIG. 8 illustrates a computing system performing a preliminary check or verification prior to an operation, specifically, a transform operation.

FIG. 8 illustrates the logic 113 performing a sanity check or compatibility determination during a transform operation on a dataset 810, which may have resulted from the union operation illustrated in FIGS. 6-7. As a non-limiting example, this transform operation may entail deleting null entries while converting the "Count" column to binary values. The logic 113 may determine whether the data types and schema in the dataset 810 are compatible with the transform operation. For example, the logic 113 may verify that the "Count" column actually exists and includes numerical or integer entries. Thus, if the "Count" column includes null data entries, conversion of such null data entries to binary may be undefined. Here, because the null entries may be deleted prior to the conversion, the transform operation may be feasible.

Figure 9:
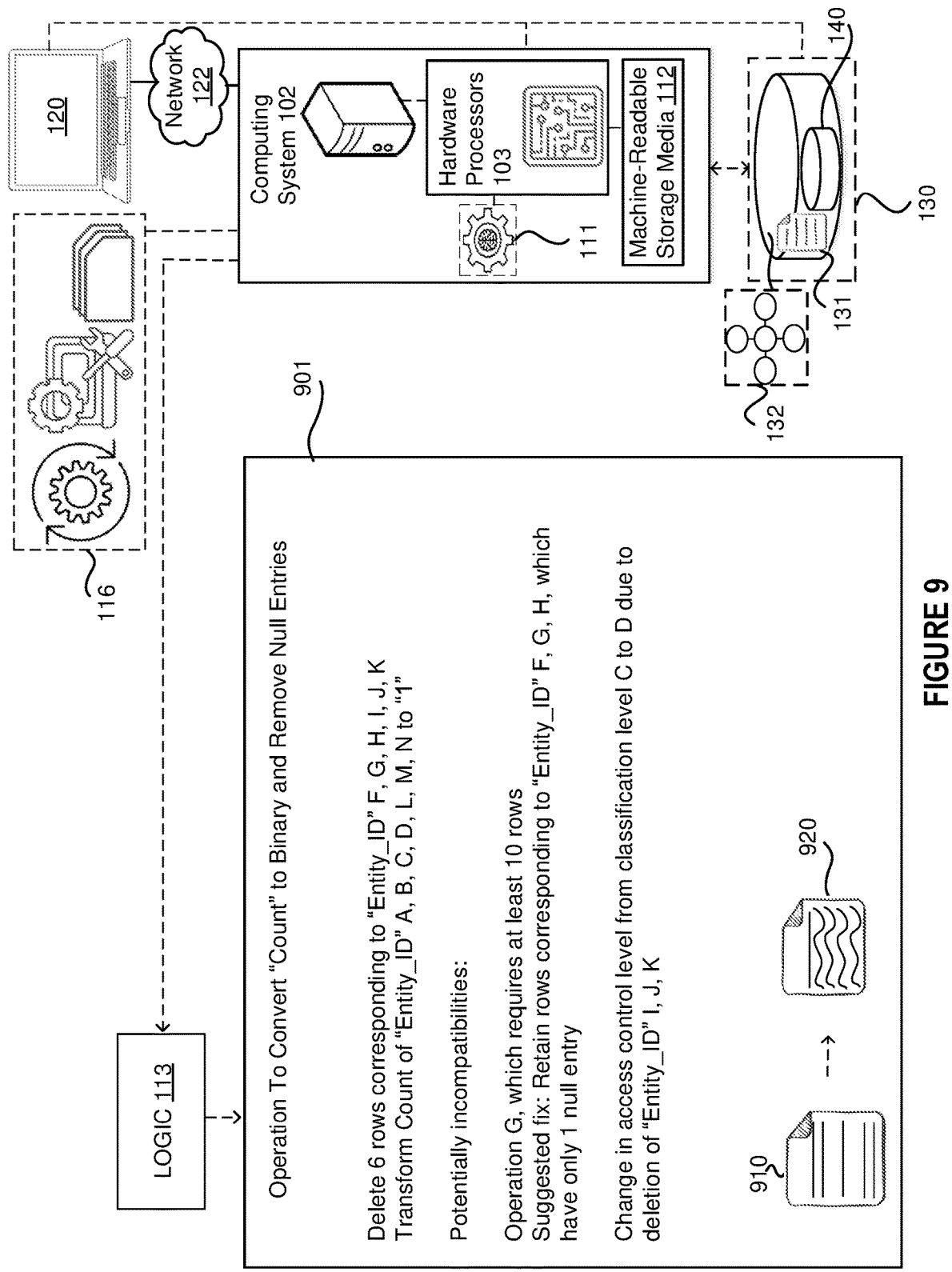
FIG. 9 illustrates a computing system generating and populating results of the preliminary check or verification of FIG. 8.

FIG. 9 illustrates the logic 113 generating and populating results of the sanity check or compatibility determination on an interface 901. The logic 113 may indicate specific details regarding the transform operation, such as, that the transform operation entails deleting six rows corresponding to "Entity_ID" of F, G, H, I, J, and K, each of which includes at least one null data entry. The logic 113 may further indicate that the transform operation involves transforming the "Count" corresponding to "Entity_ID" of A, B, C, D, L, M, and N to one while for the "Entity_ID" of E, the zero value corresponding to the "Count" is retained.

The logic 113 further determines any potential incompatibilities or conflicts (hereinafter "incompatibilities") regarding the transform operation, as well as regarding potential or actual downstream operations. Here, the logic 113 may determine that an output from the transform operation may be incompatible with potential or actual downstream operations including Operation G, which requires datasets of at least ten rows. Here, a resulting dataset from the transform operation may have only eight rows due to deletions of the rows corresponding to "Entity_ID" of F, G, H, L, M, and N. Thus, the logic 113 may suggest a fix to retain rows corresponding to a lowest or among lowest numbers of null data entries, which would include rows corresponding to "Entity_ID" of F, G, and H, each of which have one null data entry. The logic 113 may selectively transmit this fix to the platform 116, similar to the principle described in FIG. 5.

The logic 113 may further determine that the access control level resulting from the transformation has been lowered from C to D due to deletion of "Entity_ID" I, J, and K. In some examples, if merging the "Entity_ID" I, J, and K with other "Entity_ID" such as A through H would have resulted in an increased access control level due to revealing new relationships or associations, then the deletion of "Entity_ID" I, J, and K may result in previously redacted entries being unredacted.

The logic may further generate a representation of the transformation. A representation 910 may correspond to the dataset 810, and a representation 920 may correspond to a resulting dataset from the transformation.

Figure 10:
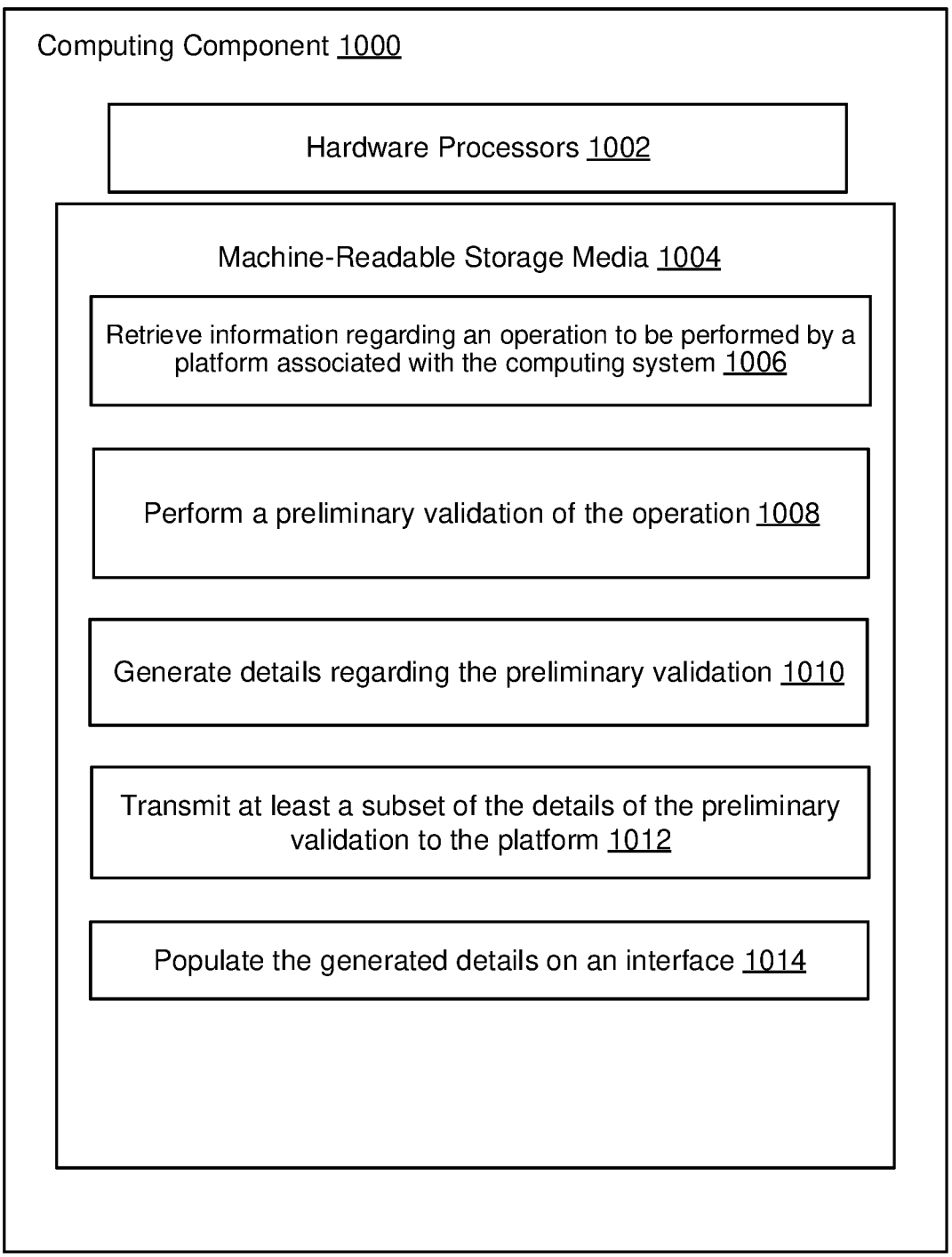
FIG. 10 illustrates a flowchart of an example method consistent with FIGS. 1A-1C and 2-9, embodied in a computing component.

FIG. 10 illustrates a computing component 1000 that includes one or more hardware processors 1002 and machine-readable storage media 1004 storing a set of machine-readable/machine-executable instructions that, when executed, cause the hardware processor(s) 1002 to perform an illustrative method of generating a speech recognition output and augmenting the speech recognition output, among other steps. It should be appreciated that there can be additional, fewer, or alternative steps performed in similar or alternative orders, or in parallel, within the scope of the various embodiments discussed herein unless otherwise stated. The computing component 900 may be implemented as the computing system 102 of FIGS. 1A-1C and 2-9. The hardware processors 1002 may be implemented as the hardware processors 103 of FIGS. 1A-1C and 2-9. The machine-readable storage media 1004 may be implemented as the machine-readable storage media 112 of FIGS. 1A-1C and 2-9, and may include suitable machine-readable storage media described in FIG. 11.

At step 1006, the hardware processor(s) 1002 may execute machine-readable/machine-executable instructions stored in the machine-readable storage media 1004 to retrieve information regarding an operation to be performed by a platform (e.g., the platform 116) associated with the computing system. The operation may include any operations described in FIGS. 1A-1C and 2-9, such as searching or retrieving, joining, merging, forming a union, or transforming. The retrieving of information may include contextual information such as that associated with an input dataset or a dataset to be operated on, that associated with the operation such as schema, data type, marker, or other constraints of input data for the operation, and/or schemas or data types of intermediate results or outputs that would be generated from the operation.

At step 1008, the hardware processor(s) 1002 may execute machine-readable/machine-executable instructions stored in the machine-readable storage media 1004 to perform a preliminary validation of the operation. The preliminary validation may include, without limitation, determining a compatibility, with downstream processes, of output schemas or formats, or output data types, of resulting datasets from the operation, as illustrated and described, for example, in FIGS. 5, 7, and 9. The preliminary validation may include determining a compatibility of input datasets or datasets on which the operation is to be performed with input constraints associated with the operation, as illustrated and described, for example, in FIGS. 5, 7, and 9. The preliminary validation may include determining a compatibility between the operation and a class structure or ontology within the platform, as illustrated and described, for example, in FIGS. 1A-1C.

At step 1010, the hardware processor(s) 1002 may execute machine-readable/machine-executable instructions stored in the machine-readable storage media 1004 to generate details regarding the preliminary validation. The generated details may include details regarding whether the preliminary validation succeeded or failed, and reasons of the success or failure. The generated details may, additionally or alternatively, include specific portions of data affected by the operation and specific changes made to those specific portions. The generated details may further include changes in access control characteristics or levels that would result from the operation, as illustrated and described, for example, in FIGS. 5, 7, and 9.

At step 1012, the hardware processor(s) 1002 may execute machine-readable/machine-executable instructions stored in the machine-readable storage media 1004 to transmit at least a subset of the details of the preliminary validation to the platform. Thus, if the validation fails and no fixes are adopted or implemented, the platform refrains from performing the operation, thereby saving computing resources and time that would otherwise have been expended in attempting the operation.

At step 1014, the hardware processor(s) 1002 may execute machine-readable/machine-executable instructions stored in the machine-readable storage media 1004 to populate the generated details on an interface, as illustrated, for example, in FIGS. 2, 5, 7, and 9.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 11:
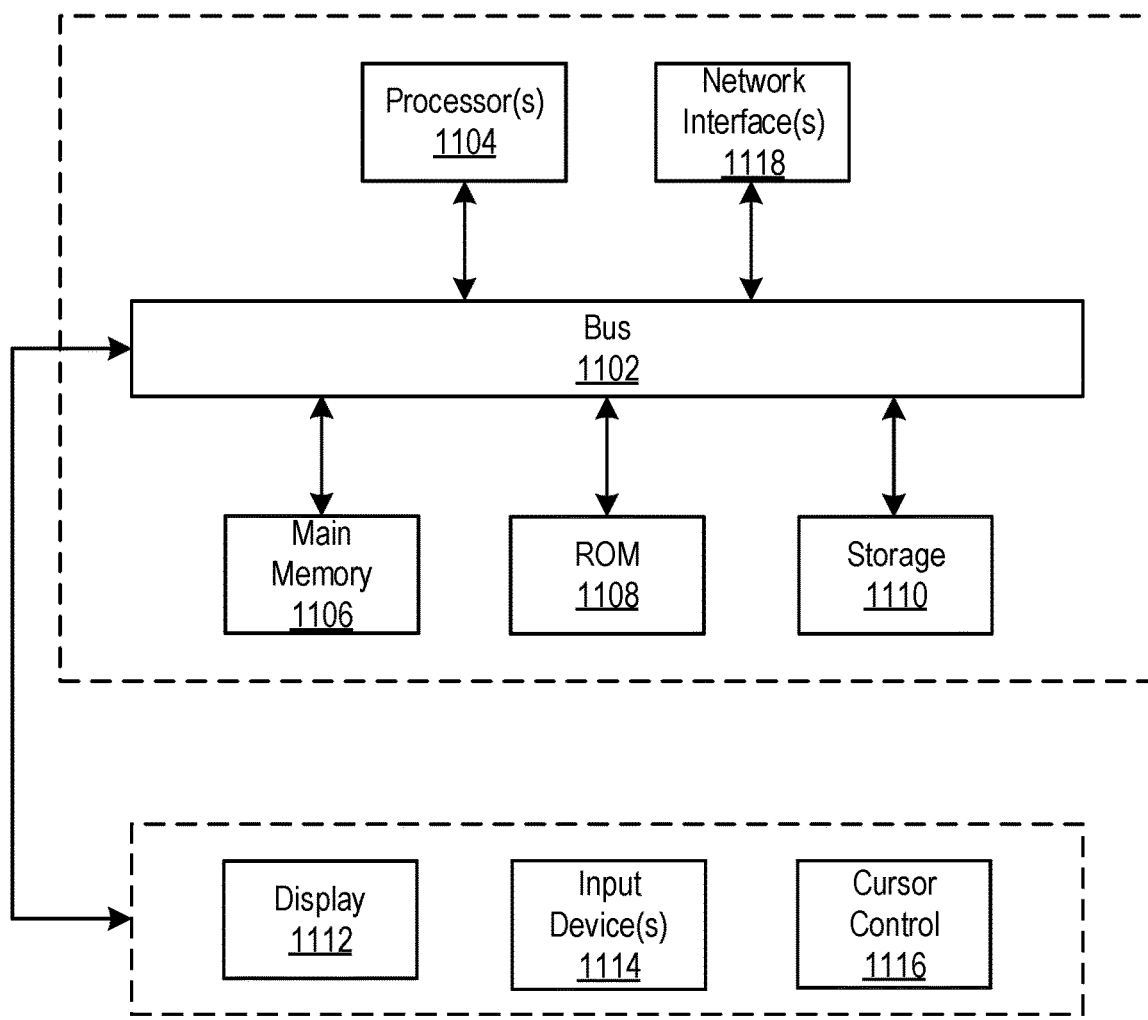
FIG. 11 illustrates a block diagram of an example computer system in which any of the embodiments described herein may be implemented.

FIG. 11 is a block diagram that illustrates a computer system 1100 upon which any of the embodiments described herein may be implemented. In some examples, the computer system 1100 may include a cloud-based or remote computing system. For example, the computer system 1100 may include a cluster of machines orchestrated as a parallel processing infrastructure. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may retrieves and executes the instructions. The instructions received by main memory 1106 may optionally be stored on storage device 1110 either before or after execution by processor 1104.

The computer system 1100 also includes a communication interface 1018 coupled to bus 1102. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1100, are example forms of transmission media.

The computer system 1100 can send messages and receive data, including program code, through the network(s), network link and communication interface 1018. In the Internet example, a server might transmit a requested code for an application program through the Internet, the ISP, the local network and the communication interface 1018.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A computing system, comprising:
one or more processors; and
memory storing instructions that, when executed by the one or more processors, cause the system to perform:
retrieving information regarding an operation to be performed by a platform associated with the computing system;
performing a preliminary validation of the operation;
generating details regarding the preliminary validation, the details comprising a potential fix;
transmitting at least a subset of the details of the preliminary validation to the platform, wherein, if the preliminary validation fails;
the platform refrains from performing the operation;
the platform selectively modifies a corresponding portion of logic to incorporate the potential fix based on a number of occurrences or a frequency at which the potential fixes have been suggested, adopted, or accepted; and
populating the generated details on an interface.

2. The computing system of claim 1, wherein the preliminary validation comprises determining a compatibility, with downstream processes, of output schemas or formats, or output data types, of resulting datasets from the operation.

3. The computing system of claim 1, wherein the preliminary validation comprises determining a compatibility of input datasets or datasets on which the operation is to be performed with input constraints associated with the operation.

4. The computing system of claim 1, wherein the preliminary validation comprises determining a compatibility between the operation and a class structure or ontology within the platform.

5. The computing system of claim 4, wherein the determination of the compatibility is based on an inheritance hierarchy within the platform.

6. The computing system of claim 1, wherein the instructions further cause the one or more processors to perform transmitting an indication to the platform of whether the preliminary validation succeeded or failed.

7. The computing system of claim 1, wherein the instructions further cause the one or more processors to perform determining one or more changes in access control levels that would result from the operation; and transmitting the one or more changes to the platform.

8. The computing system of claim 7, wherein the one or more changes result from a merging or integration of two datasets revealing an association that was previously missing from each of the two datasets prior to the merging or integration.

9. A computer-implemented method of a computing system, the computer-implemented method comprising:
retrieving information regarding an operation to be performed by a platform associated with the computing system;
performing a preliminary validation of the operation;
generating details regarding the preliminary validation, wherein the details comprise one or more changes in access control levels that would result from the operation;
transmitting at least a subset of the details of the preliminary validation to the platform, the details comprising the one or more changes, wherein, if the preliminary validation fails, the platform refrains from performing the operation; and
populating the generated details on an interface.

10. The computer-implemented method of claim 9, wherein the preliminary validation comprises determining a compatibility, with downstream processes, of output schemas or formats, or output data types, of resulting datasets from the operation.

11. The computer-implemented method of claim 9, wherein the preliminary validation comprises determining a compatibility of input datasets or datasets on which the operation is to be performed with input constraints associated with the operation.

12. The computer-implemented method of claim 9, wherein the preliminary validation comprises determining a compatibility between the operation and a class structure or ontology within the platform.

13. The computer-implemented method of claim 12, wherein the determination of the compatibility is based on an inheritance hierarchy within the platform.

14. The computer-implemented method of claim 9, further comprising:
   transmitting an indication to the platform of whether the preliminary validation succeeded or failed.

15. The computer-implemented method of claim 9, wherein the generated details comprise a potential fix, in response to a determination that the preliminary validation failed.

16. The computer-implemented method of claim 15, further comprising:
   selectively transmitting the potential fix to the platform based on a number of occurrences or a frequency at which the potential fix has been adopted or accepted, wherein the platform modifies or adds the potential fix to a corresponding portion of logic.

17. A computing system, comprising:
   one or more processors; and
   memory storing instructions that, when executed by the one or more processors, cause the system to perform:
      retrieving information regarding an operation to be performed by a platform associated with the computing system;
      performing a preliminary validation of the operation;
      generating details regarding the preliminary validation, wherein the details comprise one or more changes in access control levels that would result from the operation;
      transmitting at least a subset of the details of the preliminary validation to the platform, the details comprising the one or more changes, wherein, if the preliminary validation fails, the platform refrains from performing the operation; and
      populating the generated details on an interface.

* * * * *